US00RE42212E

(19) United States
(12) Reissued Patent
Hoffman

(10) Patent Number: US RE42,212 E
(45) Date of Reissued Patent: Mar. 8, 2011

(54) PROTECTION SYSTEM AND METHOD

(76) Inventor: Terry G. Hoffman, Grand Rapids, MI (US)

(21) Appl. No.: 11/418,553

(22) Filed: May 3, 2006

Related U.S. Patent Documents

Reissue of:
(64) Patent No.: 6,732,279
Issued: May 4, 2004
Appl. No.: 10/346,025
Filed: Jan. 16, 2003

U.S. Applications:
(63) Continuation-in-part of application No. 09/804,796, filed on Mar. 14, 2001, now abandoned.

(51) Int. Cl.
*H04L 9/00* (2006.01)

(52) U.S. Cl. ..... 709/240; 709/232; 709/238; 709/239; 713/168; 726/21; 726/22; 726/30

(58) Field of Classification Search ..... 709/240
See application file for complete search history.

(56) References Cited

U.S. PATENT DOCUMENTS 5,416,842 A 5/1995 Aziz
5,432,850 A 7/1995 Rothenberg (Continued)

OTHER PUBLICATIONS

Zenel, B.,et al, "A general purpose proxy filtering mechanism applied to the mobile environment", Proceedings of the 3rd annual ACM/IEEE international conference on Mobile computing and networking table of contents, 1997, entire document http://portal.acm.org/citation.cfm?doid=262116.262153.*

John Williamson., "Safe at Last?", Global Telephony. Overland Park: Apr. 2001. vol. 9, Iss. 4; p. 35 (5 pages).

Mendes, Gerald H. , "Next Generation IP takes shape", Business Communications Review. Hinsdale: Mar. 1996. vol. 26, Iss. 3; p. 49 (5 pages).

Hoffman, Terry George, U.S. Appl. No. 09/804,796, filed Mar. 14, 2001, entitled "Optical data transfer system—ODTS; Optically based anti–virus protection system—OBAPS."

*Primary Examiner*—Edan Orgad
*Assistant Examiner*—Ronald Baum
(74) *Attorney, Agent, or Firm*—Sterne, Kessler, Goldstein & Fox, PLLC.

(57) ABSTRACT

[An anti-virus] *A* protection system and method for use within a data transmission network to protect against the transfer of viruses from a transmission [originator] *originator,* having a discrete transmission originator [code] *code,* to a [subscriber/recipient] *subscriber/recipient,* having a discrete subscriber/recipient IP address [code] *code,* over the data transmission network [comprising the steps of] *includes:* assigning a discrete security code to the transmission [originator,] *originator;* generating a transmission pack including a discrete subscriber/recipient IP address code element corresponding to the discrete subscriber/recipient IP address code of the subscriber/recipient, a discrete security code element corresponding to the discrete security code assigned to the transmission originator, a file extension [element] *element,* and a data packet element; transmitting the transmission pack to a data transfer control; authenticating the transmission pack with the discrete subscriber/recipient IP address code element, discrete security code [element] *element,* and discrete transmission originator code; transferring the authenticated transmission pack to the [subscriber/recipient] *subscriber/recipient;* and isolating the subscriber/recipient from an unauthenticated transmission [pack] *pack,* received by the data transfer control from a transmission [originator] *originator,* to prevent the transfer of an unauthenticated transmission pack to the subscriber/recipient.

53 Claims, 4 Drawing Sheets

U.S. PATENT DOCUMENTS 5,511,122 A 4/1996 Atkinson
5,623,600 A 4/1997 Ji et al.
5,898,830 A 4/1999 Wesinger et al.
5,930,479 A * 7/1999 Hall ..... 709/238
5,958,051 A 9/1999 Renaud et al.
5,968,126 A * 10/1999 Ekstrom et al. ..... 709/225
5,978,567 A 11/1999 Rebane et al.
5,983,350 A 11/1999 Minear et al.
5,991,810 A * 11/1999 Shapiro et al. ..... 709/229
6,049,877 A 4/2000 White
6,065,118 A 5/2000 Bull et al.
6,067,620 A 5/2000 Holden et al.
6,092,194 A 7/2000 Touboul
6,098,172 A 8/2000 Coss et al.
6,105,027 A 8/2000 Schneider et al.
6,108,583 A 8/2000 Schneck et al.
6,157,721 A 12/2000 Shear et al.
6,158,011 A 12/2000 Chen et al.
6,202,081 B1 * 3/2001 Naudus ..... 709/200
6,229,806 B1 5/2001 Lockhart et al.
6,292,569 B1 9/2001 Shear et al.
6,324,648 B1 * 11/2001 Grantges, Jr. ..... 726/12
6,480,963 B1 11/2002 Tachibana et al.
6,510,464 B1 * 1/2003 Grantges et al. ..... 709/225
6,523,068 B1 * 2/2003 Beser et al. ..... 709/238
6,732,279 B2 5/2004 Hoffman
7,028,335 B1 * 4/2006 Borella et al. ..... 726/11
7,120,802 B2 10/2006 Shear et al.
2002/0040439 A1 4/2002 Kellum
2002/0069356 A1 6/2002 Kim

* cited by examiner

PROTECTION SYSTEM AND METHOD

Matter enclosed in heavy brackets [ ] appears in the original patent but forms no part of this reissue specification; matter printed in italics indicates the additions made by reissue.

CROSS REFERENCE TO RELATED APPLICATIONS

This *application is a reissue of U.S. Pat. No. 6,732,279, which issued from U.S. application Ser. No. 10/346,025, filed Jan. 16, 2003, which* is a continuation-in-part [application] of [pending application Ser.] *U.S. application Ser.* No. [09/804,796] *09/804,796,* filed Mar. 14, [2001.] *2001, now abandoned.*

BACKGROUND OF THE INVENTION

1. Field of the Invention

[A anti-virus] *A* protection system for use within a data transmission network to protect against the transfer of viruses from a source(s) or originator(s) to a recipient(s) or subscriber(s) over the data transmission network.

2. Description of the Prior Art

With the advent of data transfer over communication networks, computer viruses, worms and Trojan horses have plagued and compromised the operation of the various computers or nodes. A computer virus is a section of code that is buried or hidden in another program attaching itself to other programs in the system that, in turn, can be copied over to other programs. Such viruses can cause a message to be displayed on the screen or actually destroy programs and data. Worms, on the other hand, are destructive programs that replicate themselves using up computer [resources] *resources,* eventually causing the computer system to crash.

The prior art has attempted to reduce the effects of viruses and eliminate the proliferation through virus detection programs. For example, an operator can monitor a computer or system for such [basis] *basic* operating functions such as write, erase or format disk. When such operations occur, the user is prompted to confirm whether the operation is expected. If the particular operation or function is not expected, the user aborts the operation as *having been* prompted by a virus program. Another virus detection [method,] *method* scans program code being copied onto the system searching for recognizable patterns of program code used for viruses. Another method employs check summary on host programs known to be free from viruses. If a virus later attaches itself to a host program, the value will be different and the presence of a virus detected.

Unfortunately, despite these [efforts of] *efforts,* the prior art [suffer] *suffers* from various deficiencies. Therefore, there is a need for a system and method for effectively detecting and eliminating viruses without significantly affecting the performance of the computer. Behavior interception is not successful at detecting all viruses since a virus can be placed at locations where [such] critical operations are likely to occur for the normal operation of programs. Second, most signature scanning is only performed on new inputs from disk drives. With the advent of the Internet and its increased popularity, there are no prior art methods that have been able to successfully scan connections such as those utilized by a gateway node in communicating with other networks. Third, many of the above methods require a significant amount of computing resources, which in turn degrades the overall performance of *the* system. Thus, operating [the] virus detection programs on every computer becomes impractical. Therefore, the operation of many such virus detection programs is disabled for improved performance of individual machines.

U.S. Pat. No. 5,623,600 discloses a system for detecting and eliminating viruses on a computer network *that* includes a File Transfer Protocol (FTP) proxy server, for controlling the transfer of [files] *files,* and a Simple Mail Transfer Protocol (SMTP) proxy [server] *server,* for controlling the transfer of mail messages through the system. The FTP proxy server and SMTP proxy server run concurrently with the normal operation of the system and operate in a manner such that viruses transmitted to or from the network in files and messages are detected before transfer into or from the system. The FTP proxy server and SMTP proxy server scan all incoming and outgoing files and [messages respectively before transfer] *messages, respectively,* for viruses *before transfer,* and then transfer the files and messages, only if they do not contain any viruses. The method for processing a file before transmission into or from the network includes the steps of receiving the data transfer command and file name; transferring the file to a system node; performing virus detection on the file; determining whether the file contains any viruses; transferring the file from the system to a recipient node if the file does not contain a virus; and deleting the file if the file contains a virus.

U.S. Pat. No. 6,157,721 and U.S. Pat. No. 6,292,569 [describes a system and method] *describe systems and methods* using cryptography to protect [Secure] *secure* computation environments from bogus or rogue load modules, [executables] *executables,* and other data elements through use of digital signatures, [seals] *seals,* and certificates issued by a verifying authority. The verifying authority tests the load modules or other executables to verify that the corresponding specifications are accurate and complete, and then digitally signs the load module or other executable based on tamper resistance work factor classification. Secure computation environments with different tamper resistance work factors use different verification digital signature authentication techniques allowing one tamper resistance work factor environment to protect against load modules from another, different tamper resistance work factor environment. Several dissimilar digital signature algorithms may be used to reduce vulnerability from algorithm compromise, and subsets of multiple digital signatures may be used to reduce the scope of any specific compromise.

U.S. Pat. No. 5,416,842 teaches a first data processing device (node I) coupled to a first private network and to a firewall server (FWA). Firewall server FWA is in turn coupled to a public network such as the Internet. A second data processing device (node J) is coupled to a second private network that is coupled to the Internet through a firewall server (FWB). Node I provides a data [packet] *packet,* including IP data and a destination address for the intended receiving node [J] *J,* to the firewall FWA. The firewall FWA is provided with a secret value [a,] *"a,"* and a public value. The firewall FWB is provided with a secret value *"b,"* and a public value. The firewall FWA obtains a Diffie-Hellman (DH) certificate for the firewall FWB and determines the public value from the DH certificate. Firewall FWA then computes the value and derives a key K. ($K_{ab}$) from the value .varies.sup.ab mod [p.] $p$ ($^{\alpha^{ab}}$ $mod\ p$). A transient key K. ($K_p$) is randomly generated and is used to encrypt the data packet to be transmitted by firewall FWA to firewall FWB. The encrypted data packet is then encapsulated in a transmission packet by the firewall FWA. The transmission packet includes an unencrypted destination address for the firewall FWB. Firewall FWA then sends the transmission packet to firewall FWB over the Internet. Upon receipt of the transmission packet from firewall FWA, firewall FWB obtains a DH certificate for firewall FWA, and determines the public value of from the DH certificate. Firewall FWB computes the value of .varies.sup.ab mod [p,] ($\propto ab \bmod p$), and derives the key K.sub.ab. ($K_{ab}$). Firewall B utilizes the key K.sub.ab ($K_{ab}$) to decrypt the transient key K. [and] ($K_p$), using the decrypted transient key K. ($K_p$), firewall FWB decrypts the encrypted data packet received from FWA, thereby resulting in the recovery of the original data sent by node I in unencrypted form to the firewall FWA. The firewall FWB then transmits the decrypted data packet to the receiving node J over the second private network.

U.S. Pat. No. 5,432,850 shows a method for secure transmission of data having a destination address and a source address on a shared communication network. The method comprise the steps [of] *of:* transmitting a multiplicity of data frames, each containing at least an encrypted data sequence employing the destination address as at least part of a decryption key [therefor,] *therefor;* receiving the multiplicity of data frames at a receiver on the shared communication [network] *network;* and attempting to decrypt the encrypted data sequence by employing the local address of the receiver as at least part of a decryption key.

U.S. Pat. No. 5,511,122 relates to an internet authentication method to verify a sending host by a receiving host or an intermediate router or gateway. The method comprises the steps of: obtaining a network address and a public key of a receiving host; utilizing the public key from the receiving host in combination with a private key of the originating host to generate a cryptographic signature; transmitting the signature along with data through a first subnetwork in at least one packet; receiving at least one packet at the receiving host; and the receiving host utilizing a private key of said receiving host site and a public key of said originating host to verify said cryptographic signature.

U.S. Pat. No. 6,065,118 shows a system to reduce the risk of damage to data or programs in an end user computer system programmed to operate in response to an imported data stream containing one or more mobile program components from an external source. The incoming data stream is screened to identify mobile program components of that data stream. [Some] *Prior to being executed, some* of the mobile program components are passed to a program execution location isolated from the end user system [prior to being executed] to operate in a desired manner. The execution location has an interface with the external source of the data stream and an interface with the end user system. The operation of the interface between the execution location and the end user system is programmed so that only data that has been interacted on by the program component within the execution location in a specified and controlled manner can be passed to and from the end user system.

U.S. Pat. No. 6,067,620 describes a secure network interface unit (SNIU) to provide multi-level security on a network having a plurality of secured and unsecured users [including] *including:* network interface means for communicating on the [network,] *network;* identifying the source and destination of a message intercepted on the network; determining the security levels of each of the plurality of users; a trusted computing base for determining whether the message, if transmitted to the destination user, will violate security parameters; [and,] cryptographically encrypting messages sent to, and decrypting messages received [from] *from,* another SNIU affiliated with the destination user.

U.S. Pat. No. 6,108,583 shows a system and method for data communication with adaptive security in which a send host transmits a data stream to a receive host in packets which contain an authentication data block with an authentication header and a signature block. The authentication header advantageously contains various fields including a verification type, a security algorithm, a minimum security level, a target security level, and an actual security level. The receive host adaptively performs verification of the data packets using varying security levels based in part on the availability of security operations per second (SOPS) in the receive host. Where a data stream in the receive host is delayed by a security processing bottleneck, the receive host may alter the verification type, security algorithm, or the actual security level to speed up the processing of the data stream by reducing the amount of security processing performed. The receive host further allocates the SOPS among the data streams received.

U.S. Pat. No. 6,229,806 describes a communication system in which a user device generates authentication information unique to the user device and provides a data packet including this authentication information to an infrastructure part which is a gateway or a host. The packet also contains a host identifier or time dependent information. This is used at the gateway or the host to authenticate the packet.

*U.S. Patent Application Publication No.* 2002/0023214 shows how secure computation environments are protected from bogus or rogue load modules, [executables] *executables,* and other data elements through use of digital signatures, [seals] *seals,* and certificates issued by a verifying authority. A verifying authority tests the load modules or other executables to verify that their corresponding specifications are accurate and complete, and then digitally signs the load module or other executable based on *a* tamper resistance work factor classification. Secure computation environments with different tamper resistance work factors use different verification digital signature authentication techniques, e.g. different signature algorithms and/or signature verification keys, allowing one tamper resistance work factor environment to protect itself against load modules from another, different tamper resistance work factor environment. Several dissimilar digital signature algorithms may be used to reduce vulnerability from algorithm compromise, and subsets of multiple digital signatures may be used to reduce the scope of any specific compromise.

*U.S. Patent Application Publication No.* 2002/0040439 teaches a system and method for providing external data signal isolation, and signal-level information-preserving-data-transformations, to enable safe, operationally efficient, information sharing between protected information systems and networks and external, potentially hostile, information systems and [networks] *networks,* which [neutralizes] *neutralize* any imbedded hostile executable codes such as viruses that may be in data-signals incoming from the external systems and networks. The system and method prevent untransformed external data-signals from entering protected systems and/or networks using an intermediate screen that is a computer hardware device. The intermediate screen, which may be implemented as a network of systems, is deployed between the protected systems and external systems and is used to process all incoming signals from the external [system] *systems* to obtain transformed data sets from which information is extracted before it is passed to the protected [system] *systems*. The incoming signals all remain confined in the intermediate screen.

SUMMARY OF THE INVENTION

The present invention relates to [an anti-virus] *a* protection system and method for use with a data transmission network to protect against the transfer of viruses or other unwanted data. The data transmission network comprises a network of transmission originators and subscribers/recipients coupled through a data transfer control means or router.

The data transfer control means functions as a gate keeper to detect viruses, worms, Trojan horses or spam before handing-off any data to a subscriber/recipient acting as a virtual isolation room to isolate subscribers/recipients from unwanted transmissions.

The [anti-virus] protection method is implemented through the use of a transmission pack formatted to allow the data transmission control means to scan the transmission pack for preassigned security codes, subscriber/recipient information and other authentication information to control the transfer of data between transmission originators and subscribers/recipients.

The method comprises the steps of assigning a discrete security code to the transmission originator; generating a transmission pack including a discrete subscriber/recipient IP address code element corresponding to the discrete subscriber/recipient IP address code of the subscriber/recipient, a discrete security code element corresponding to the discrete security code assigned to the transmission originator, a file extension [element] *element,* and a data packet element; transmitting the transmission pack to the data transfer control means; authenticating the transmission pack with the discrete subscriber/recipient IP address code element, discrete security code [element] *element,* and transmission originator; transferring the authenticated transmission pack to the [subscriber/recipient] *subscriber/recipient;* and isolating the subscriber/recipient from an unauthenticated transmission pack to prevent the transfer of an unauthenticated transmission pack to the subscriber/recipient.

The invention accordingly comprises the features of construction, combination of elements, and arrangement of parts which will be exemplified in the construction hereinafter set forth, and the scope of the invention will be indicated in the claims.

[The invention accordingly comprises the features of construction, combination of elements, and arrangement of parts which will be exemplified in the construction hereinafter set forth, and the scope of the invention will be indicated in the claims.]

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
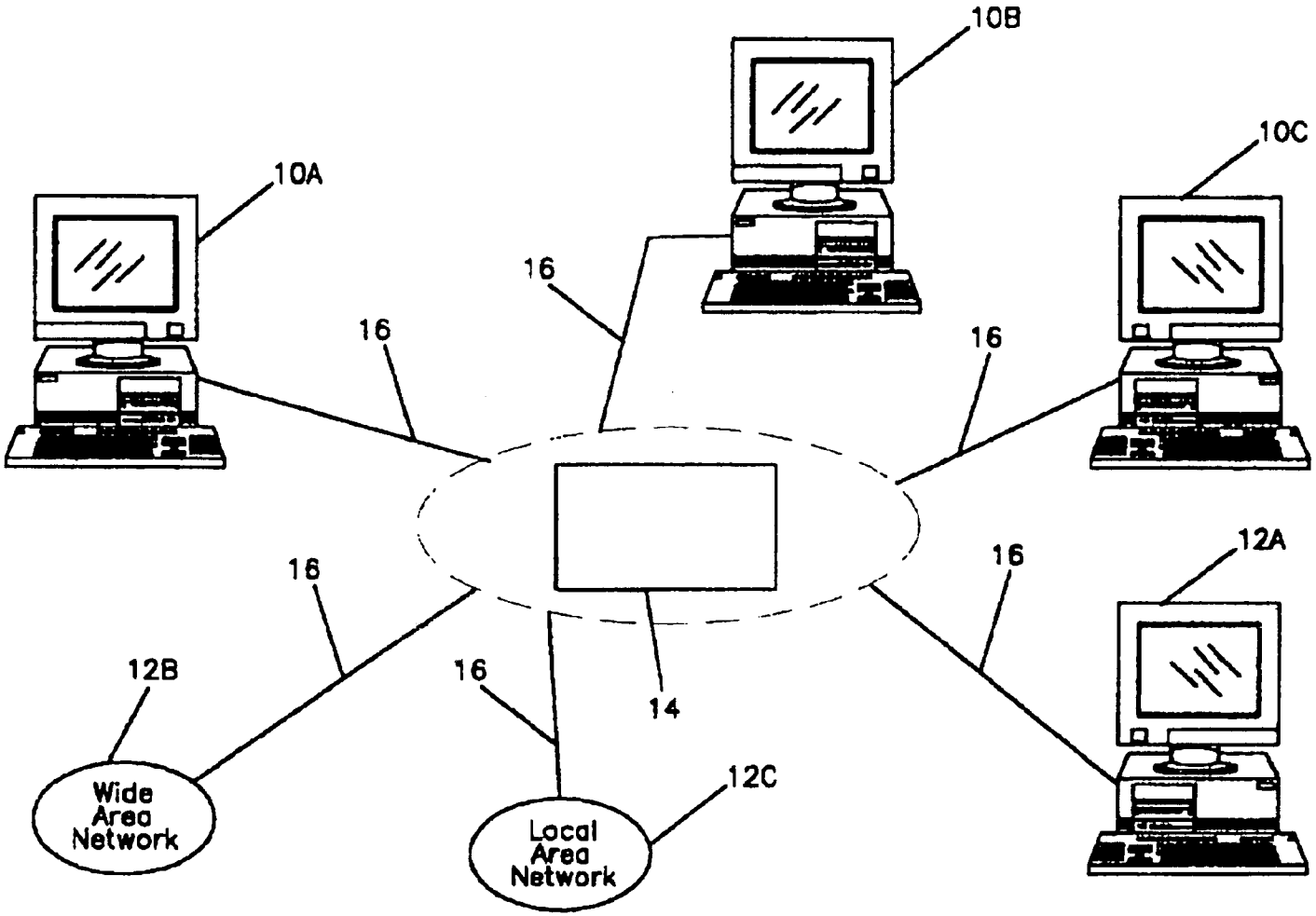
FIG. 1 depicts a data communication network in which the [anti-virus] protection system of the present invention is deployed.

The present invention relates to [an anti-virus] *a* protection system and method for use with a data transmission network to protect against the transfer of viruses or other unwanted data. As shown in FIG. 1, the data transmission network comprises at least one transmission originator 10 coupled to at least one subscriber/recipient 12 by a data transfer control means or router 14 and a plurality of communication links each indicated as 16. The subscribers/recipients 12 may compromise a personal computer 12A, a wide area network 12B or a local area network 12C.

Since the data transfer control means 14 includes circuitry and logic to scan transmissions from the transmission originator 10 as a gate keeper to detect viruses, worms, Trojan horses or spam before handing-off any data to a subscriber/recipient 12, the data transfer control means 14, in effect, acts as a virtual isolation room to isolate subscribers/recipients 12 from unwanted transmissions.

The [anti-virus] protection method is implemented through the use of a transmission pack formatted to allow the data transmission control means to scan the transmission pack for [preassigned] *pre-assigned* security codes, subscriber/recipient [information] *information,* and other authentication information to control the transfer of data between transmission originators and subscriber/recipients.

Figure 4:
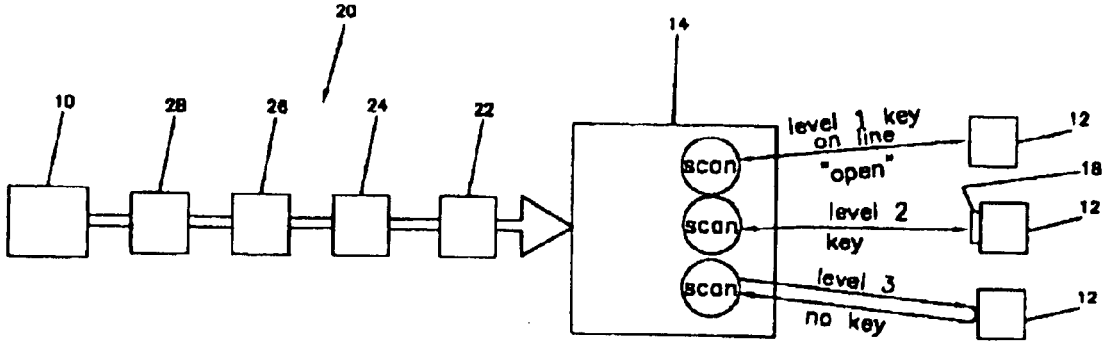
FIG. 4 [diagramically] *diagrammatically* depicts the system of the [anti-virus] protection system of the present invention.

An extended security or key code as described hereinafter is selected and assigned to each transmission originator 10. As shown in FIG. 1, the system includes a plurality of security levels. For example, a transmission originator 10A that transmits particularly significant or sensitive [information] *information,* such as a bank [of] *or* other financial institution that transmits through an 'on-line' basis, [having been] *can be* assigned a 'secure degree' encrypted address or key. Less [sensivite] *sensitive* information that might be subject to [E-mails] *e-mails* between a subscriber/recipient 12A/12B/12C and a transmission originator 10B can be accessed or transferred with the second level of security. At this level, the transmission is screened for known viruses and/or trigger references and, if clean, then routed to a holding mailbox or mini-server 18 (FIG. 4). Transmissions not having an assigned security code are classified as 'non-extension' transmissions, either for selective subsequent 'discrete' review by a subscriber/recipient 12A/12B/12C or [rejected] *for rejection* and [automatically returned] *automatic return* to the transmission originator 10C.

Of course, a transmission originator 10 can be assigned multiple security codes corresponding to each of the plurality of security levels to allow the system to authenticate and transfer data of different levels of security from a single transmission originator 10 to one or more subscribers/recipients 12A/12B/12C.

As shown in FIGS. 1, [3] *3,* and 4, the data transmission control means or router 14 is operatively 'in-line' between transmission originators 10A/10/B/10C and the subscribers/recipients 12A/12B/12C. For example, in the larger wide area network systems 12B, the data transmission control means or hub router 14 *either* can be [either] at the internet service provider hub router or NAP distribution point that precedes the final transmittal address or can be internal to the termination point receiver/router. In smaller [systems] *systems,* such as the local area network 12C or individual PC 12A, the data transmission control means or hub router 14 can be located at the terminal point, either as part of the PC or at the Intranet terminal receiver/router.

As previously described, the [anti-virus protector] *protection* method is implemented through the use of a transmission pack formatted to allow the data transmission control means or router 14 to scan the transmission pack for [preassigned] *pre-assigned* security codes, subscriber/recipient

[information] *information,* and other authentication information and to transfer data from transmission originators 10A/10B/10C to subscribers/recipients 12A/12B/12C when a transmission pack is authenticated as having the appropriate coded information.

Figure 2:
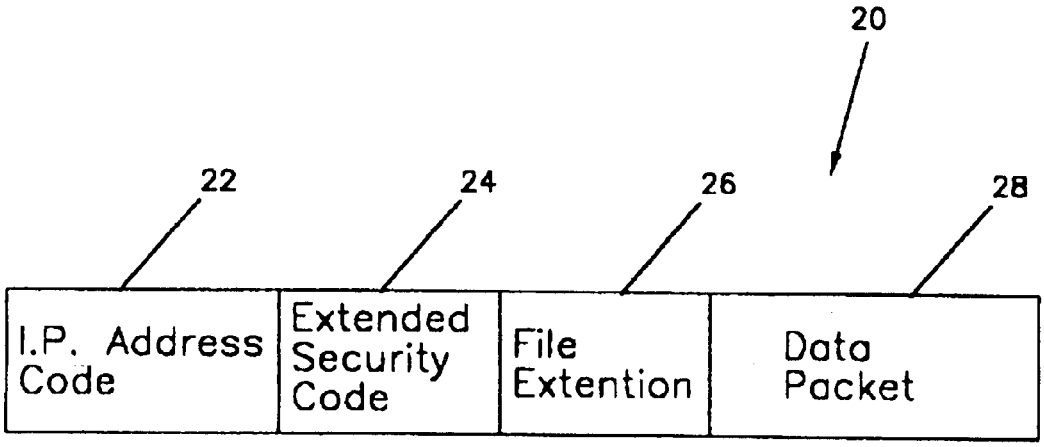
FIG. 2 depicts a transmission pack of the [anti-virus] protection system of the present invention.

As shown in FIG. 2, the transmission pack generally indicated as 20 comprises an IP address code element 22 that identifies the postal box of an addressee or recipient, an extended security or key code element 24 to designate one of the plurality of corresponding security levels previously described, a file extension element 26 to indicate the program [language] *language,* and a data packet element 28 comprising the data to be transmitted or transferred.

The method of the present invention is to protect against the transfer of viruses from a transmission originator [10] *10,* having a discrete transmission originator [code] *code,* to a subscriber/recipient [12] *12,* having a discrete subscriber/recipient IP address [code] *code,* over the data transmission network comprising the steps [of] *of:* assigning a discrete security code to the transmission originator 10; generating a transmission pack 20 including the discrete subscriber/recipient IP address code element 22 corresponding to the discrete subscriber/recipient IP address code of the subscriber/recipient 12, a discrete security code element 24 corresponding to the discrete security code assigned to the transmission originator 10, a file extension element [26] *26,* and a data packet element 28; transmitting the transmission pack 20 to a data transfer control means 14; authenticating the transmission pack 20 with the discrete subscriber/recipient IP address code element 22, discrete security code element [24] *24,* and discrete transmission originator code; transferring the authenticated transmission pack 20 to the subscriber/recipient [12] *12;* and isolating the subscriber/recipient 12 from an unauthenticated transmission pack to prevent the transfer of an unauthenticated transmission [packet] *packet,* scanned and compared with the authenticating information by the data transfer control means [14] *14,* to the subscriber/recipient 12.

The discrete security codes and corresponding discrete security code elements 24 may represent one of a plurality of predetermined security levels where a single transmission originator 10 can be [preassigned] *pre-assigned* multiple level security codes corresponding to more than one of the levels of security for data as varying sensitivity or security dictates.

In addition, the discrete security code elements 24 can include the identity of the transmission originator 10 assigned the specific discrete security code and corresponding discrete security code element.

As previously mentioned, a discrete extended security or key code element [22] *24* is selected and assigned to each transmission originator 10A/10B/10C to correspond to one of the three levels of security. In addition, a transmission originator 10 may be assigned several different discrete security code elements to transmit and transfer data to subscribers/recipients having different security requirements.

Figure 3:
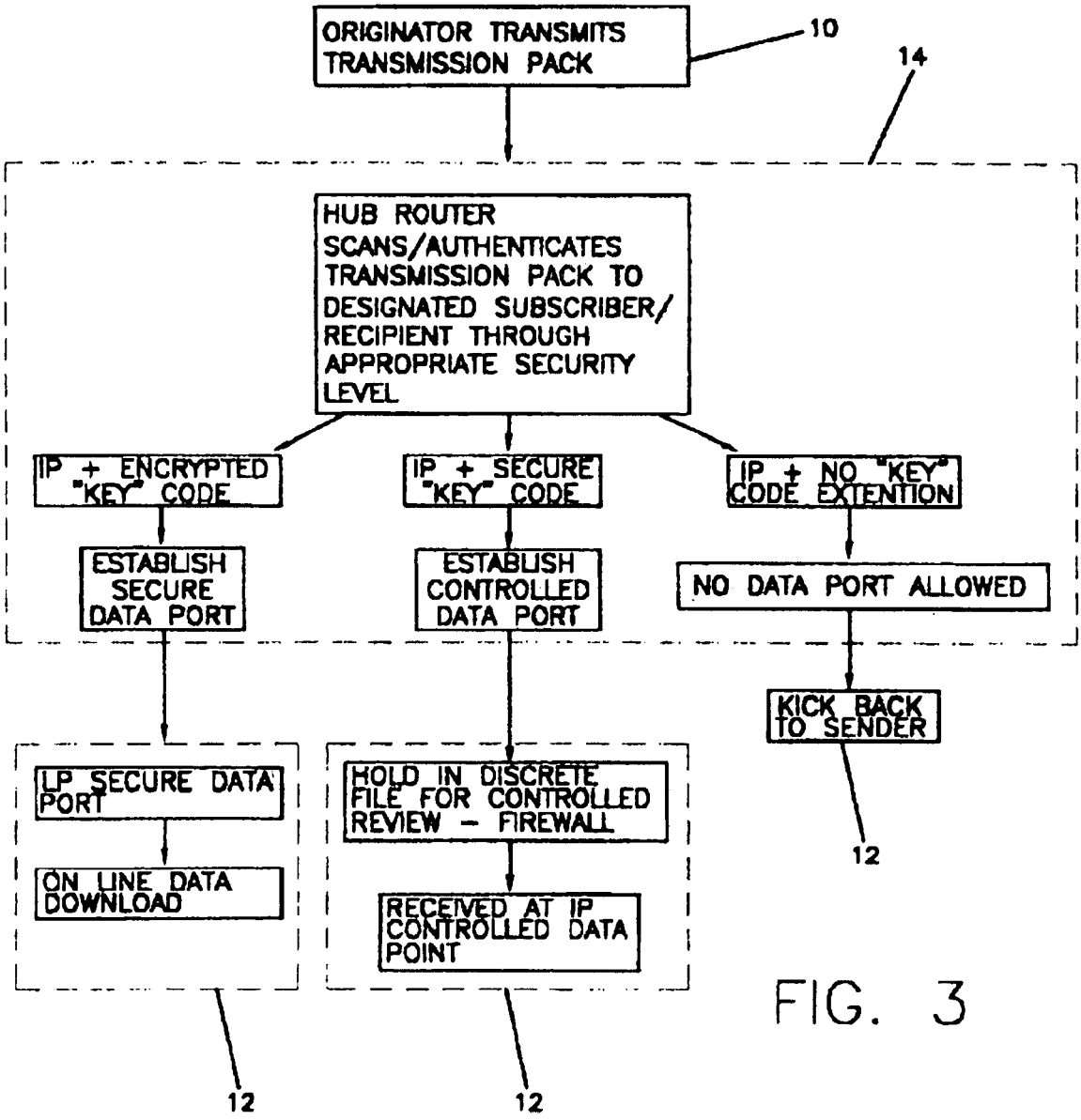
FIG. 3 is a flow chart depicting the sequence of operation of the method of the [anti-virus] protection system of the present invention.

Specifically as depicted in [FIG. 3,] *FIGS. 3 and 4,* the data transfer control means or hub router 14 scans transmission packs 20 addressed to a subscriber/recipient 12A/12B/12C through appropriate security level.

If the IP address code element 22, encrypted "key" code or discrete security code element 24 (first security [level)] *level),* and transmission originator 10 are authenticated by comparison with the authentic transmission pack format, the system establishes a secure data port to transfer or download the data to the subscribers/recipients 12.

If the IP address code element 22, secure "key" code or discrete security code element 24 (second security [level)] *level),* and transmission originator 10 are authenticated, the system establishes a controlled data port [received] at *an* IP controlled data point and *the data are* routed to a holding mail box or mini-server 18 at the subscriber/recipient 12 for selective review before downloading by the subscriber/recipient 12.

If the IP address code element 22 [and no] *without a* "key" code [extention] *extension* 24 (third level of security) [are] *is* not authenticated, no data port is opened or established and data is returned to the transmission originator 10.

It will thus be seen that the objects set forth above, among those made apparent from the preceding [description] *description,* are efficiently attained [and] *and,* since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. [An anti-virus] *A* protection method for use within a data transmission network to protect against the transmission of unwanted data from a transmission originator having a plurality of assigned security codes corresponding to a plurality of data security levels to a subscriber/recipient having a plurality of assigned discrete subscriber/recipient IP address codes over the data transmission network including a data transfer control means and a plurality of data transmission ports corresponding to the plurality of security levels, wherein said plurality of assigned security codes includes a first data security level code element and a second data security level code element and said plurality of data transmission ports include a first data transmission port and a second data transmission port such that data are transmitted through the first data transmission port to the subscriber/recipient when said discrete security code element is authenticated as a first data security code level element and data are transmitted through the second data transmission port to the subscriber/recipient when said discrete security code element is authenticated as a second data security level code element, whereas the [anti-virus protection] method comprising the steps of:

generating a transmission pack including a discrete security code element corresponding to the data security level selected by the transmission originator of the data to be transmitted and a discrete subscriber/recipient IP address code element corresponding to the discrete subscriber/recipient IP address code of the [subscriber/recipient,] *subscriber/recipient;* transmitting data and said transmission pack to the data transfer control means that includes circuitry and logic to scan said transmission packets from the transmission originator for discrete security code elements and discrete subscriber/recipient IP address code elements to control the transfer of data from transmission originators to subscriber/recipients through said data transfer control means;

scanning said transmission pack to authenticate discrete subscriber/recipient IP address code elements and discrete security code elements; *and* transferring data in authenticated transmission packs to the subscriber/recipient through the data transmission port corresponding to the data security level.

2. The [anti-virus] protection method of claim 1 wherein said plurality of assigned security codes further includes a third data security level code element such that data are transmitted through a third data transmission port to the subscriber/recipient when said discrete security code element is authenticated as a third security level code element.

3. The [anti-virus] protection method of claim 1 wherein said plurality of assigned security codes further includes a third data security level code element such that transmitted data is isolated from the subscriber/recipient when an unauthenticated transmission pack is sent to prevent the transfer of the transmission pack to the subscriber/recipient.

4. The [anti-virus] protection method of claim 1 wherein said first data transmission port comprises a secure data port to transfer the data to the subscriber/recipient and said second data transmission port comprises a controlled data port wherein authenticated data are held for selective review by the subscriber/recipient before downloading by the subscriber/recipient.

5. The [anti-virus] protection method of claim 4 wherein said plurality of assigned security codes further includes a third data security level code element such that data are transmitted through a third data transmission port to the subscriber/recipient when said discrete security code element is authenticated as a third security level code element.

6. The [anti-virus] protection method of claim 4 wherein said plurality of assigned security codes further includes a third data security level code element such that transmitted data is isolated from the subscriber/recipient when an unauthenticated transmission pack is sent to prevent the transfer of the transmission pack to the subscriber/recipient.

7. [An anti-virus] *A* protection method for use within a data transmission network to protect against the transmission of unwanted data from a transmission originator having a plurality of assigned security codes corresponding to a plurality of data security levels to a subscriber/recipient having an assigned discrete subscriber/recipient IP address code over the data transmission network including a data transfer control means and a plurality of data transmission ports corresponding to the plurality of security levels, wherein said plurality of assigned security codes includes a first data security level code element and a second data security level code element and said plurality of data transmission ports include a first data transmission port and a second data transmission port such that data are transmitted through the first data transmission port to the subscriber/recipient when said discrete security code element is authenticated as a first data security code level element and data are transmitted through the second data transmission port to the subscriber/recipient when said discrete security code element is authenticated as a second data security level code element, whereas the [anti-virus protection] method comprising the steps of:

generating a transmission pack including a discrete security code element corresponding to the data security level selected by the transmission originator of the data to be transmitted and a discrete subscriber/recipient IP address code element corresponding to the discrete subscriber/recipient IP address code of the subscriber/recipient, a file extension element and a data packet element;

transmitting data and said transmission pack to the data transfer control means that includes circuitry and logic to scan the transmission packets from the transmission originator for discrete security code elements and discrete subscriber/recipient IP address code elements to control the transfer of data from transmission originators to subscriber/recipients through the data transfer control means;

scanning said transmission pack for discrete subscriber/recipient IP address code elements and discrete security code elements; *and* transferring data from authenticated transmission packs to the subscriber/recipient through the data transmission port corresponding to the data security level.

8. The [anti-virus] protection method of claim 7 wherein said plurality of assigned security codes further includes a third data security level code element such that data are transmitted through a third data transmission port to the subscriber/recipient when said discrete security code element is authenticated as a third security level code element.

9. The [anti-virus] protection method of claim 7 wherein said plurality of assigned security codes further includes a third data security level code element such that data is isolated from the subscriber/recipient when an unauthenticated transmission pack to prevent the transfer of to the subscriber/recipient.

10. The [anti-virus] protection method of claim 7 wherein said first data transmission port comprises a secure data port to transfer the data to the subscriber/recipient and said second data transmission port comprises a controlled data port wherein authenticated data are held for selective review by the subscriber/recipient before downloading by the subscriber/recipient.

11. The [anti-virus] protection method of claim 10 wherein said plurality of assigned security codes further includes a third data security level code element such that data are transmitted through a third data transmission port to the subscriber/recipient when said discrete security code element is authenticated as a third security level code element.

12. The [anti-virus] protection method of claim 10 wherein said plurality of assigned security codes further includes a third data security level code element such that transmitted data is isolated from the subscriber/recipient when an unauthenticated transmission pack is sent to prevent the transfer of the transmission pack to the subscriber/recipient.

*13. A data transmission controller, comprising:*

*circuitry and control logic configured to:*

*authenticate a received transmission pack of data, including determining if the transmission pack includes a discrete security code element corresponding to a discrete security code assigned to an external transmission originator, where the discrete security code is one of plural pre-assigned security codes, and where each security code and corresponding security code element represents one of plural predetermined security levels; and*

*in accordance with a result of authentication, establish a discrete data port for transmitting data of the transmission pack, where a type of the discrete data port is selected from plural predetermined data port types corresponding to the plural predetermined security levels.*

*14. The data transmission controller of claim 13, wherein the circuitry and control logic further are configured to authenticate the transmission pack by scanning and comparing elements of the transmission pack with an authentic transmission pack format.*

*15. The data transmission controller of claim 13, wherein the circuitry and control logic further are configured to determine if the transmission pack includes a discrete recipi-*

*ent IP address code element corresponding to a discrete recipient IP address code of an external recipient.*

*16. The data transmission controller of claim 15, wherein:*

*if the circuitry and control logic authenticate the IP address code element, a discrete security code element corresponding to a predetermined security level, and the transmission originator, then the circuitry and control logic establish a secure data port to transmit the data of the transmission pack to the external recipient.*

*17. The data transmission controller of claim 16, wherein the discrete security code element is an encrypted key code, and the circuitry and control logic are configured to decode the encrypted key code.*

*18. The data transmission controller of claim 15, wherein:*

*if the circuitry and control logic authenticate the IP address code element, a discrete security code element corresponding to a predetermined security level, and the transmission originator, then the circuitry and control logic establish a controlled data port to transmit the data of the transmission pack to a holding structure of the external recipient.*

*19. The data transmission controller of claim 18, wherein the circuitry and control logic establish the controlled data port to transmit the data of the transmission pack to a mailbox of the external recipient.*

*20. The data transmission controller of claim 18, wherein the circuitry and control logic establish the controlled data port to transmit the data of the transmission pack to a mini-server of the external recipient.*

*21. The data transmission controller of claim 18, wherein the discrete security code element is a secure key code.*

*22. The data transmission controller of claim 15, wherein:*

*if the circuitry and control logic fail to authenticate an IP address code element, a discrete security code element corresponding to a predetermined security level, and the transmission originator, then the circuitry and control logic transmit the transmission pack back to the external transmission originator.*

*23. The data transmission controller of claim 15, wherein:*

*if the circuitry and control logic fail to authenticate an IP address code element, a discrete security code element corresponding to a predetermined security level, and the transmission originator, then the circuitry and control logic transmit the transmission pack to the external recipient for discrete review by the external recipient.*

*24. The data transmission controller of claim 15, wherein:*

*if the circuitry and control logic authenticate the IP address code element, a discrete security code element corresponding to a first security level, and the transmission originator, then the circuitry and control logic establish a secure data port to transmit the data of the transmission pack to the external recipient;*

*if the circuitry and control logic authenticate the IP address code element, a discrete security code element corresponding to a second security level, and the transmission originator, then the circuitry and control logic establish a controlled data port to transmit the data of the transmission pack to a holding structure of the external recipient; and*

*if the circuitry and control logic fail to authenticate the IP address code element, a discrete security code element corresponding to a predetermined security level, and the transmission originator, then the circuitry and control logic transmit the transmission pack back to the external transmission originator.*

*25. The data transmission controller of claim 13, wherein the data transmission controller is a router.*

*26. The data transmission controller of claim 13, wherein the data transmission controller is a hub router.*

*27. The data transmission controller of claim 13, wherein the data transmission controller is located at an internet service provider hub router.*

*28. The data transmission controller of claim 13, wherein the data transmission controller is located at an NAP distribution point.*

*29. The data transmission controller of claim 13, wherein the data transmission controller is part of a recipient personal computer.*

*30. The data transmission controller of claim 13, wherein the data transmission controller is part of an Intranet terminal receiver/router.*

*31. A data transmission controller, comprising:*

*means for authenticating a transmission pack of data, including means for determining if the transmission pack includes a discrete security code element corresponding to a discrete security code assigned to an external transmission originator, where the discrete security code is one of plural pre-assigned security codes, and where each security code and corresponding security code element represents one of plural predetermined security levels; and*

*means for establishing a discrete data port for transmitting data of the transmission pack, where a type of the discrete data port is selected from plural predetermined data port types corresponding to the plural predetermined security levels.*

*32. The data transmission controller of claim 31, wherein the means for authenticating further comprises means for scanning and comparing elements of the transmission pack with an authentic transmission pack format.*

*33. The data transmission controller of claim 31, wherein the means for authenticating comprises means for determining if the transmission pack includes a discrete recipient IP address code element corresponding to a discrete recipient IP address code of an external recipient.*

*34. A protection method for controlling data transmission, comprising:*

*authenticating a received transmission pack of data, including determining if the transmission pack includes a discrete security code element corresponding to a discrete security code assigned to an external transmission originator, where the discrete security code is one of plural pre-assigned security codes, and where each security code and corresponding security code element represents one of plural predetermined security levels; and*

*in accordance with a result of the authenticating, establishing a discrete data port for transmitting data of the transmission pack, where a type of the discrete data port is selected from plural predetermined data port types corresponding to the plural predetermined security levels.*

*35. The protection method of claim 34, wherein the authenticating further comprises:*

*scanning and comparing elements of the transmission pack with an authentic transmission pack format.*

*36. The protection method of claim 35, wherein the authenticating further comprises:*

*determining if the transmission pack includes a discrete recipient IP address code element corresponding to a discrete recipient IP address code of an external recipient.*

*37. The protection method of claim 36, further comprising:*

*if the scanning and comparing authenticate the IP address code element, a discrete security code element corresponding to a predetermined security level, and the transmission originator, then establishing a secure data port to transmit the data of the transmission pack to the external recipient.*

*38. The protection method of claim 37, wherein the discrete security code element is an encrypted key code, and the authenticating further comprises decrypting the encrypted key code.*

*39. The protection method of claim 36, further comprising:*

*if the scanning and comparing authenticate the IP address code element, a discrete security code element corresponding to a predetermined security level, and the transmission originator, then establishing a controlled data port to transmit the data of the transmission pack to a holding structure of the external recipient.*

*40. The protection method of claim 39, further comprising transmitting the data of the transmission pack via the controlled data port to a mailbox of the external recipient.*

*41. The protection method of claim 39, further comprising transmitting the data of the transmission pack via the controlled data port to a mini-server of the external recipient.*

*42. The protection method of claim 39, wherein the discrete security code element is a secure key code.*

*43. The protection method of claim 36, further comprising:*

*if the scanning and comparing fail to authenticate an IP address code element, a discrete security code element corresponding to a predetermined security level, and the transmission originator, then transmitting the transmission pack back to the external transmission originator.*

*44. The protection method of claim 36, further comprising:*

*if the scanning and comparing fail to authenticate an IP address code element, a discrete security code element corresponding to a predetermined security level, and the transmission originator, then transmitting the transmission pack to the external recipient for discrete review by the external recipient.*

*45. The protection method of claim 36, further comprising:*

*if the scanning and comparing authenticate the IP address code element, a discrete security code element corresponding to a first security level, and the transmission originator, then establishing a secure data port to transmit the data of the transmission pack to the external recipient;*

*if the scanning and comparing authenticate the IP address code element, a discrete security code element corresponding to a second security level, and the transmission originator, then establishing a controlled data port to transmit the data of the transmission pack to a holding structure of the external recipient; and*

*if the scanning and comparing fail to authenticate an IP address code element, a discrete security code element corresponding to a predetermined security level, or the transmission originator, then transmitting the transmission pack back to the external transmission originator.*

*46. A data transmission recipient, comprising:*

*a data processor; and*

*in-line circuitry and control logic associated with the data processor and configured to:*

*authenticate a received transmission pack of data, including determining if the transmission pack includes a discrete security code element corresponding to a discrete security code assigned to an external transmission originator, where the discrete security code is one of plural pre-assigned security codes, and where each security code and corresponding security code element represents one of plural predetermined security levels;*

*in accordance with a result of authentication, establish a discrete data port for transmitting data of the transmission pack, where a type of the discrete data port is selected from plural predetermined data port types corresponding to the plural predetermined security levels; and*

*transmit data of the authenticated transmission pack via the discrete data port to the data processor.*

*47. The data transmission recipient of claim 46, wherein the data transmission recipient is a personal computer.*

*48. The data transmission recipient of claim 46, wherein the data transmission recipient is a local area network.*

*49. The data transmission recipient of claim 46, wherein the data transmission recipient is an Intranet terminal receiver/router.*

*50. A data transmission system, comprising:*

*at least one transmission originator, each transmission originator having at least one discrete security code assigned thereto;*

*at least one recipient, each recipient having at least one discrete recipient IP address code assigned thereto; and*

*a data transmission controller arranged in communication with the at least one transmission originator and the at least one recipient,*

*wherein the data transmission controller comprises circuitry and control logic configured to:*

*authenticate a transmission pack of data received from a discrete transmission originator, including*

*determining if the transmission pack includes a discrete security code element corresponding to a discrete security code assigned to the discrete transmission originator, where the discrete security code is one of plural pre-assigned security codes, and where each security code and corresponding security code element represents one of plural predetermined security levels;*

*in accordance with a result of authentication, establish a discrete data port for transmitting data of the transmission pack, where a type of the discrete data port is selected from plural predetermined data port types corresponding to the plural predetermined security levels; and*

*transmit data of the transmission pack via the discrete data port to a discrete recipient.*

*51. The system of claim 50, wherein the at least one transmission originator is pre-assigned plural discrete security codes having different security levels.*

*52. The system of claim 50, wherein the data transmission controller comprises circuitry and control logic configured to:*

*authenticate the transmission pack of data received from the discrete transmission originator, including*

*scanning and comparing elements of the transmission pack with an authentic transmission pack format.*

*53. The system of claim 50, wherein said data transmission controller comprises circuitry and control logic configured to:*

*authenticate a transmission pack of data received from a discrete transmission originator, including*

*determining if the transmission pack includes a discrete recipient IP address code element corresponding to a discrete recipient IP address code of the discrete recipient, and*

*transmit the data of the transmission pack via the discrete data port to the discrete recipient.*

* * * * *

UNITED STATES PATENT AND TRADEMARK OFFICE

CERTIFICATE OF CORRECTION

PATENT NO. : RE42,212 E
APPLICATION NO. : 11/418553
DATED : March 8, 2011
INVENTOR(S) : Terry G. Hoffman It is certified that error appears in the above-identified patent and that said Letters Patent is hereby corrected as shown below:

On the face page of the patent, line 5 under "OTHER PUBLICATIONS," "entire document" should be "entire document,".

On the face page of the patent, under "Attorney, Agent or Firm," "PLLC" should be "P.L.L.C.".

Please replace issued claims 1-45 and 47-53 with the following amended claims dated June 30, 2010. Claim 46 was amended under 37 C.F.R. § 1.312 on November 19, 2010 and entered by the examiner, and appears to be correct.

1. [An anti-virus] A protection method for use within a data transmission network to protect against the transmission of unwanted data from a transmission originator having a plurality of assigned security codes corresponding to a plurality of data security levels to a subscriber/recipient having a plurality of assigned discrete subscriber/recipient IP address codes over the data transmission network including a data transfer control means and a plurality of data transmission ports corresponding to the plurality of security levels, wherein [said] the plurality of assigned security codes includes a first data security level code element and a second data security level code element and [said]the plurality of data transmission ports include a first data transmission port and a
second data transmission port such that data are transmitted through the first data transmission port to the subscriber/recipient [when said]in response to a determination that the discrete security code element is authenticated as a first data security code level element and data are transmitted through the second data transmission port to the subscriber/recipient [when said]in response to a determination that the discrete security code element is authenticated as a second data security level code element, [whereas]the [anti-virus protection]method comprising [ the steps of]:

Signed and Sealed this
Twenty-sixth Day of July, 2011

David J. Kappos

David J. Kappos
*Director of the United States Patent and Trademark Office* generating a transmission pack including a discrete security code element corresponding to the data security level selected by the transmission originator of the data to be transmitted and a discrete subscriber/recipient IP address code element corresponding to the discrete subscriber/recipient IP address code of the subscriber/recipient[,];

transmitting data and [said]the transmission pack to the data transfer control means that [includes circuitry and logic]is configured to scan [said]the transmission [packets]pack from the transmission originator for discrete security code elements and discrete subscriber/recipient IP address code elements to control the transfer of data from the transmission [originators]originator to the subscriber/[recipients]recipient through [said]the data transfer control means;

scanning [said]the transmission pack to authenticate discrete subscriber/recipient IP address code elements and discrete security code elements; and transferring data in the authenticated transmission [packs]pack to the subscriber/recipient through the data transmission port corresponding to the data security level.

2. The [anti-virus]protection method of claim 1 wherein [said]the plurality of assigned security codes further includes a third data security level code element such that data are transmitted through a third data transmission port to the subscriber/recipient [when said]in response to a determination that the discrete security code element is authenticated as a third security level code element.

3. The [anti-virus]protection method of claim 1 wherein [said]the plurality of assigned security codes further includes a third data security level code element such that [transmitted] data transmitted to the data transfer control means is isolated from the subscriber/recipient [when]in response to a determination that the transmission pack is an unauthenticated transmission pack, [is sent] to prevent the transfer of the unauthenticated transmission pack to the subscriber/recipient.

4. The [anti-virus ]protection method of claim 1 wherein [said]the first data transmission port comprises a secure data port to transfer the data to the subscriber/recipient and [said]the second data transmission port comprises a controlled data port wherein authenticated data are held for selective review by the subscriber/recipient before downloading by the subscriber/recipient.

5. The [anti-virus]protection method of claim 4 wherein [said]the plurality of assigned security codes further includes a third data security level code element such that data are transmitted through a third data transmission port to the subscriber/recipient [when said]in response to a determination that the discrete security code element is authenticated as a third security level code element.

6. The [anti-virus] protection method of claim 4 wherein [said]the plurality of assigned security codes further includes a third data security level code element such that [transmitted] data transmitted to the data transfer control means is isolated from the subscriber/recipient [when]in response to a determination that the transmission pack is an unauthenticated transmission pack, [is sent] to prevent the transfer of the unauthenticated transmission pack to the subscriber/recipient.

7. [An anti-virus] A protection method for use within a data transmission network to protect against the transmission of unwanted data from a transmission originator having a plurality of assigned security codes corresponding to a plurality of data security levels to a subscriber/recipient having an assigned discrete subscriber/recipient IP address code over the data transmission network including a data transfer control means and a plurality of data transmission ports corresponding to the plurality of security levels, wherein [said]the plurality of assigned security codes includes a first data security level code element and a second data security level code element and [said]the plurality of data transmission ports include a first data transmission port and a second data transmission port such that data are transmitted through the first data transmission port to the subscriber/recipient [when said]in response to a determination that the discrete security code element is authenticated as a first data security code level element and data are transmitted through the second data transmission port to the subscriber/recipient [when said]in response to a determination that the discrete security code element is authenticated as a second data security level code element, [whereas]the [anti-virus protection]method comprising [the steps of]:

generating a transmission pack including a discrete security code element corresponding to the data security level selected by the transmission originator of the data to be transmitted and a discrete subscriber/recipient IP address code element corresponding to the discrete subscriber/recipient IP address code of the subscriber/recipient, a file extension element and a data packet element;

transmitting data and [said]the transmission pack to the data transfer control means that [includes circuitry and logic]is configured to scan the transmission [packets]pack from the transmission originator for discrete security code elements and discrete subscriber/recipient IP address code elements to control the transfer of data from the transmission [originators]originator to the subscriber/[recipients]recipient through the data transfer control means;

scanning [said]the transmission pack for discrete subscriber/recipient IP address code elements and discrete security code elements; and transferring data from the authenticated transmission [packs]pack to the subscriber/recipient through the data transmission port corresponding to the data security level.

8. The [anti-virus] protection method of claim 7 wherein [said]the plurality of assigned security codes further includes a third data security level code element such that data are transmitted through a third data transmission port to the subscriber/recipient [when said]in response to a determination that the discrete security code element is authenticated as a third security level code element.

9. The [anti-virus] protection method of claim 7 wherein [said]the plurality of assigned security codes further includes a third data security level code element such that data is isolated from the subscriber/recipient [when]in response a determination that the transmission pack is an unauthenticated transmission pack, to prevent the transfer of the unauthenticated transmission pack to the subscriber/recipient.

10. The [anti-virus] protection method of claim 7 wherein [said]the first data transmission port comprises a secure data port to transfer the data to the subscriber/recipient and [said]the second data transmission port comprises a controlled data port wherein [authenticated] data [are]in the authenticated transmission pack is held for selective review by the subscriber/recipient before downloading by the subscriber/recipient.

11. The [anti-virus] protection method of claim 10 wherein [said]the plurality of assigned security codes further includes a third data security level code element such that data are transmitted through a third data transmission port to the subscriber/recipient [when said]in response to a determination that the discrete security code element is authenticated as a third security level code element.

12. The [anti-virus] protection method of claim 10 wherein [said]the plurality of assigned security codes further includes a third data security level code element such that [transmitted] data transmitted in the transmission pack is isolated from the subscriber/recipient [when]in response to a determination that the transmission pack is an unauthenticated transmission pack, [is sent] to prevent the transfer of the transmission pack to the subscriber/recipient.

13. A data transmission controller, comprising:
circuitry and control logic configured to:

*authenticate a received transmission pack of data, including determining whether the transmission pack includes a discrete security code element corresponding to a discrete security code assigned to an external transmission originator, where the discrete security code is one of plural pre-assigned security codes, and where each security code and corresponding security code element represents one of plural predetermined security levels: and*

*in accordance with a result of authentication, establish a discrete data port for transmitting data of the authenticated transmission pack, where a type of the discrete data port is selected from plural predetermined data port types corresponding to the plural predetermined security levels.*

*14. The data transmission controller of claim 13, wherein the circuitry and control logic further are configured to authenticate the transmission pack by scanning and comparing elements of the transmission pack with an authentic transmission pack format.*

15. The data transmission controller of claim 13, wherein the circuitry and control logic further are configured to determine whether the transmission pack includes a discrete recipient IP address code element corresponding to a discrete recipient IP address code of an external recipient.

16. The data transmission controller of claim 15, wherein the circuitry and control logic further are configured to:

*in response to a determination that the IP address code element, a discrete security code element corresponding to a predetermined security level, and the transmission originator are authenticated, establish a secure data port to transmit the data of the transmission pack to the external recipient.*

17. The data transmission controller of claim 16, wherein the discrete security code element is an encrypted key code, and the circuitry and control logic are configured to decode the encrypted key code.

18. The data transmission controller of claim 15, wherein the circuitry and control logic further are configured to:

*in response to a determination that the IP address code element, a discrete security code element corresponding to a predetermined security level, and the transmission originator are authenticated, establish a controlled data port to transmit the data of the transmission pack to a holding structure of the external recipient.*

19. The data transmission controller of claim 18, wherein the circuitry and control logic establish the controlled data port to transmit the data of the transmission pack to a mailbox of the external recipient.

20. The data transmission controller of claim 18, wherein the circuitry and control logic establish the controlled data port to transmit the data of the transmission sack to a mini-server of the external recipient.

21. The data transmission controller of claim 18, wherein the discrete security code element is a secure key code.

22. The data transmission controller of claim 15, wherein the circuitry and control logic further are configured to:

*in response to a determination that the IP address code element, a discrete security code element corresponding to a predetermined security level, and the transmission originator are not authenticated, transmit the transmission pack back to the eternal transmission originator.*

23. The data transmission controller of claim 15, wherein the circuitry and control logic further are configured to:

*in response to a determination that the IP address code element, a discrete security code element corresponding to a predetermined security level, and the transmission originator are not authenticated, transmit the transmission pack to the external recipient for discrete review by the external recipient.*

24. The data transmission controller of claim 15, wherein the circuitry and control logic further are configured to:

*in response to a determination that the IP address code element, a discrete security code element corresponding to a first security level, and the transmission originator are authenticated,*

*establish a secure data port to transmit the data of the transmission pack to the external recipient;*

*in response to a determination that the IP address code element, a discrete security code element corresponding to a second security level, and the transmission originator are authenticated, establish a controlled data port to transmit the data of the transmission pack to a holding structure of the external recipient; and*

*in response to a determination that the IP address code element, a discrete security code element corresponding a predetermined security level, and the transmission originator are not authenticated, transmit the transmission pack back to the external transmission originator.*

25. The data transmission controller of claim 13, wherein the data transmission controller is a router.

26. The data transmission controller of claim 13, wherein the data transmission controller is a hub router.

27. The data transmission controller of claim 13, wherein the data transmission controller is located at an internet service provider hub router.

28. The data transmission controller of claim 13, wherein the data transmission controller is located at an NAP distribution point.

29. The data transmission controller of claim 13, wherein the data transmission controller is part of a recipient personal computer.

30. The data transmission controller of claim 13, wherein the data transmission controller is part of an Intranet terminal receiver/router.

31. A data transmission controller, comprising:

*means for authenticating a transmission pack of data, including means for determining whether the transmission pack includes a discrete security code element corresponding to a discrete security code assigned to an external transmission originator, where the discrete security code is one of plural pre-assigned security codes, and where each security code and corresponding security code element represents one of plural predetermined security levels; and*

*means for establishing a discrete data port for transmitting data of the authenticated transmission pack, where a type of the discrete data port is selected from plural predetermined data*

*port types corresponding to the plural predetermined security levels.*

32. The data transmission controller of claim 31, wherein the means for authenticating further comprises means for scanning and comparing elements of the transmission pack with an authentic transmission pack format.

33. The data transmission controller of claim 31, wherein the means for authenticating comprises means for determining whether the transmission pack includes a discrete recipient IP address code element corresponding to a discrete recipient IP address code of an external recipient.

34. A protection method for controlling data transmission, comprising:

*authenticating a received transmission pack of data, including determining whether the transmission pack includes a discrete security code element corresponding to a discrete security code assigned to an external transmission originator, where the discrete security code is one of plural pre-assigned security codes, and where each security code and corresponding security code element represents one of plural predetermined security levels; and*

*in accordance with a result of the authenticating, establishing a discrete data port for transmitting data of the authenticated transmission pack, where a type of the discrete data port is selected from plural predetermined data port types corresponding to the plural predetermined security levels.*

35. The protection method of claim 34, wherein the authenticating further comprises:

*scanning and comparing elements of the transmission pack with an authentic transmission pack format.*

36. The protection method of claim 35, wherein the authenticating further comprises:

*determining whether the transmission pack includes a discrete recipient IP address code element corresponding to a discrete recipient IP address code of an external recipient.*

37. The protection method of claim 36, further comprising:

*in response to a determination the scanning and comparing authenticate the IP address*

*code element, a discrete security code element corresponding to a predetermined security level, and the transmission originator, establishing a secure data port to transmit the data of the transmission pack to the external recipient.*

38. The protection method of claim 37, wherein the discrete security code element is an encrypted key code, and the authenticating further comprises decrypting the encrypted key code.

39. The protection method of claim 36, further comprising:

*in response to a determination the scanning and comparing authenticate the IP address code element, a discrete security code element corresponding to a predetermined security level, and the transmission originator, establishing a controlled data port to transmit the data of the transmission pack to a holding structure of the external recipient.*

40. The protection method of claim 39, further comprising transmitting the data of the transmission pack via the controlled data port to a mailbox of the external recipient.

41. The protection method of claim 39, further comprising transmitting the data of the transmission pack via the controlled data port to a mini-server of the external recipient.

42. The protection method of claim 39, wherein the discrete security code element is a secure key code.

43. The protection method of claim 36, further comprising:

*in response to a determination the scanning and comparing fail to authenticate an IP address code element, a discrete security code element corresponding to a predetermined security level, and the transmission originator, transmitting the transmission pack back to the external transmission originator.*

44. The protection method of claim 36, further comprising:

*in response to a determination the scanning and comparing fail to authenticate an IP address code element, a discrete security code element corresponding to a predetermined security level and the transmission originator, transmitting the transmission pack to the external recipient for discrete review by the external recipient.*

45. The protection method of claim 36, further comprising:

*in response to a determination the scanning and comparing authenticate the IP address code element, a discrete security code element corresponding to a first security level, and the transmission originator, establishing a secure data port to transmit the data of the transmission pack to the external recipient;*

*in response to a determination the scanning and comparing authenticate the IP address code element, a discrete security code element corresponding to a second security level, and the transmission originator, establishing a controlled data port to transmit the data of the transmission pack to a holding structure of the external recipient; and*

*in response to a determination the scanning and comparing fail to authenticate an IP address code element, a discrete security code element corresponding to a predetermined security level, or the transmission originator, transmitting the transmission pack back to the external transmission originator.*

47. The data transmission recipient of claim 46, wherein the data transmission recipient is a personal computer.

48. The data transmission recipient of claim 46, wherein the data transmission recipient is a local area network.

49. The data transmission recipient of claim 46, wherein the data transmission recipient is an Intranet terminal receiver/router.

50. A data transmission system, comprising:

*at least one transmission originator, each transmission originator having at least one discrete security code assigned thereto;*

*at least one recipient, each recipient having at least one discrete recipient IP address code assigned thereto; and*

*a data transmission controller arranged in communication with the at least one transmission originator and the at least one recipient.*

*wherein the data transmission controller comprises circuitry and control logic configured to:*

*authenticate a transmission pack of data received from a discrete transmission originator, including*

*determine whether the transmission pack includes a discrete security code element corresponding to a discrete security code assigned to the discrete transmission originator, where the discrete security code is one of plural pre-assigned security codes, and where each security code and corresponding security code element represents one of plural predetermined security levels;*

*in accordance with a result of authentication, establish a discrete data port for transmitting data of the transmission pack, where a type of the discrete data port is selected from plural predetermined data port types corresponding to the plural predetermined security levels: and*

*transmit data of the transmission pack via the discrete data port to a discrete recipient.*

51. The system of claim 50, wherein the at least one transmission originator is pre-assigned plural discrete security codes having different security levels.

52. The system of claim 50, wherein the data transmission controller comprises circuitry and control logic configured to:

*authenticate the transmission pack of data received from the discrete transmission originator, including*

*scan and compare elements of the transmission pack with an authentic transmission pack format.*

53. The system of claim 50, wherein the data transmission controller comprises circuitry and control logic configured to:

*authenticate a transmission pack of data received from a discrete transmission originator, including*

*determine whether the transmission pack includes a discrete recipient IP address code element corresponding to a discrete recipient IP address code of the discrete recipient, and*

*transmit the data of the authenticated transmission pack via the discrete data port to the discrete recipient.*

UNITED STATES PATENT AND TRADEMARK OFFICE

CERTIFICATE OF CORRECTION

PATENT NO. : RE42,212 E
APPLICATION NO. : 11/418553
DATED : March 8, 2011
INVENTOR(S) : Terry G. Hoffman It is certified that error appears in the above-identified patent and that said Letters Patent is hereby corrected as shown below:

On the face page of the patent, line 5 under "OTHER PUBLICATIONS," "entire document" should be "entire document,".

On the face page of the patent, under "Attorney, Agent or Firm," "PLLC" should be "P.L.L.C.".

Please replace issued claims 1-45 and 47-53 with the following amended claims dated June 30, 2010. Claim 46 was amended under 37 C.F.R. § 1.312 on November 19, 2010 and entered by the examiner, and appears to be correct.

1. [An anti-virus] A protection method for use within a data transmission network to protect against the transmission of unwanted data from a transmission originator having a plurality of assigned security codes corresponding to a plurality of data security levels to a subscriber/recipient having a plurality of assigned discrete subscriber/recipient IP address codes over the data transmission network including a data transfer control means and a plurality of data transmission ports corresponding to the plurality of security levels, wherein [said] the plurality of assigned security codes includes a first data security level code element and a second data security level code element and [said]the plurality of data transmission ports include a first data transmission port and a second data transmission port such that data are transmitted through the first data transmission port to the subscriber/recipient [when said]in response to a determination that the discrete security code element is authenticated as a first data security code level element and data are transmitted through the second data transmission port to the subscriber/recipient [when said]in response to a determination that the discrete security code element is authenticated as a second data security level code element, [whereas]the [anti-virus protection]method comprising [ the steps of]:

generating a transmission pack including a discrete security code element corresponding to the data security level selected by the transmission originator of the data to be transmitted and a discrete subscriber/recipient IP address code element corresponding to the discrete subscriber/recipient IP address code of the subscriber/recipient[,];

This certificate supersedes the Certificate of Correction issued July 26, 2011.

Signed and Sealed this
Second Day of April, 2013

Teresa Stanek Rea
*Acting Director of the United States Patent and Trademark Office* transmitting data and [said]the transmission pack to the data transfer control means that [includes circuitry and logic]is configured to scan [said]the transmission [packets]pack from the transmission originator for discrete security code elements and discrete subscriber/recipient IP address code elements to control the transfer of data from the transmission [originators]originator to the subscriber/[recipients]recipient through [said]the data transfer control means;

scanning [said]the transmission pack to authenticate discrete subscriber/recipient IP address code elements and discrete security code elements; and transferring data in the authenticated transmission [packs]pack to the subscriber/recipient through the data transmission port corresponding to the data security level.

2. The [anti-virus]protection method of claim 1 wherein [said]the plurality of assigned security codes further includes a third data security level code element such that data are transmitted through a third data transmission port to the subscriber/recipient [when said]in response to a determination that the discrete security code element is authenticated as a third security level code element.

3. The [anti-virus]protection method of claim 1 wherein [said]the plurality of assigned security codes further includes a third data security level code element such that [transmitted] data transmitted to the data transfer control means is isolated from the subscriber/recipient [when]in response to a determination that the transmission pack is an unauthenticated transmission pack, [is sent] to prevent the transfer of the unauthenticated transmission pack to the subscriber/recipient.

4. The [anti-virus ]protection method of claim 1 wherein [said]the first data transmission port comprises a secure data port to transfer the data to the subscriber/recipient and [said]the second data transmission port comprises a controlled data port wherein authenticated data are held for selective review by the subscriber/recipient before downloading by the subscriber/recipient.

5. The [anti-virus]protection method of claim 4 wherein [said]the plurality of assigned security codes further includes a third data security level code element such that data are transmitted through a third data transmission port to the subscriber/recipient [when said]in response to a determination that the discrete security code element is authenticated as a third security level code element.

6. The [anti-virus] protection method of claim 4 wherein [said]the plurality of assigned security codes further includes a third data security level code element such that [transmitted] data transmitted to the data transfer control means is isolated from the subscriber/recipient [when]in response to a determination that the transmission pack is an unauthenticated transmission pack, [is sent] to prevent the transfer of the unauthenticated transmission pack to the subscriber/recipient.

7. [An anti-virus] A protection method for use within a data transmission network to protect against the transmission of unwanted data from a transmission originator having a plurality of assigned security codes corresponding to a plurality of data security levels to a subscriber/recipient having an assigned discrete subscriber/recipient IP address code over the data transmission network including a data transfer control means and a plurality of data transmission ports corresponding to the plurality of security levels, wherein [said]the plurality of assigned security codes includes a first data security level code element and a second data security level code element and [said]the plurality of data transmission ports include a first data transmission port and a second data transmission port such that data are transmitted through the first data transmission port to the subscriber/recipient [when said]in response to a determination that the discrete security code element is authenticated as a first data security code level element and data are transmitted through the second data transmission port to the subscriber/recipient [when said]in response to a determination that the discrete security code element is authenticated as a second data security level code element, [whereas]the [anti-virus protection]method comprising [the steps of]:

generating a transmission pack including a discrete security code element corresponding to the data security level selected by the transmission originator of the data to be transmitted and a discrete subscriber/recipient IP address code element corresponding to the discrete subscriber/recipient IP address code of the subscriber/recipient, a file extension element and a data packet element;

transmitting data and [said]the transmission pack to the data transfer control means that [includes circuitry and logic]is configured to scan the transmission [packets]pack from the transmission originator for discrete security code elements and discrete subscriber/recipient IP address code elements to control the transfer of data from the transmission [originators]originator to the subscriber/[recipients]recipient through the data transfer control means;

scanning [said]the transmission pack for discrete subscriber/recipient IP address code elements and discrete security code elements; and transferring data from the authenticated transmission [packs]pack to the subscriber/recipient through the data transmission port corresponding to the data security level.

8. The [anti-virus] protection method of claim 7 wherein [said]the plurality of assigned security codes further includes a third data security level code element such that data are transmitted through a third data transmission port to the subscriber/recipient [when said]in response to a determination that the discrete security code element is authenticated as a third security level code element.

9. The [anti-virus] protection method of claim 7 wherein [said]the plurality of assigned security codes further includes a third data security level code element such that data is isolated from the subscriber/recipient [when]in response a determination that the transmission pack is an unauthenticated transmission pack, to prevent the transfer of the unauthenticated transmission pack to the subscriber/recipient.

10. The [anti-virus] protection method of claim 7 wherein [said]the first data transmission port comprises a secure data port to transfer the data to the subscriber/recipient and [said]the second data transmission port comprises a controlled data port wherein [authenticated] data [are]in the authenticated transmission pack is held for selective review by the subscriber/recipient before downloading by the subscriber/recipient.

11. The [anti-virus] protection method of claim 10 wherein [said]the plurality of assigned security codes further includes a third data security level code element such that data are transmitted through a third data transmission port to the subscriber/recipient [when said]in response to a determination that the discrete security code element is authenticated as a third security level code element.

12. The [anti-virus] protection method of claim 10 wherein [said]the plurality of assigned security codes further includes a third data security level code element such that [transmitted] data transmitted in the transmission pack is isolated from the subscriber/recipient [when]in response to a determination that the transmission pack is an unauthenticated transmission pack, [is sent] to prevent the transfer of the transmission pack to the subscriber/recipient.

13. A data transmission controller, comprising:
circuitry and control logic configured to:
*authenticate a received transmission pack of data, including determining whether the transmission pack includes a discrete security code element corresponding to a discrete security code assigned to an external transmission originator, where the discrete security code is one of plural pre-assigned security codes, and where each security code and corresponding security code element represents one of plural predetermined security levels; and*
*in accordance with a result of authentication, establish a discrete data port for transmitting data of the authenticated transmission pack, where a type of the discrete data port is selected from plural predetermined data port types corresponding to the plural predetermined security levels.*

*14. The data transmission controller of claim 13, wherein the circuitry and control logic further are configured to authenticate the transmission pack by scanning and comparing elements of the transmission pack with an authentic transmission pack format.*

15. The data transmission controller of claim 13, wherein the circuitry and control logic further are configured to determine whether the transmission pack includes a discrete recipient IP address code element corresponding to a discrete recipient IP address code of an external recipient.

16. The data transmission controller of claim 15, wherein the circuitry and control logic further are configured to:
*in response to a determination that the IP address code element, a discrete security code element corresponding to a predetermined security level, and the transmission originator are authenticated, establish a secure data port to transmit the data of the transmission pack to the external recipient.*

17. The data transmission controller of claim 16, wherein the discrete security code element is an encrypted key code, and the circuitry and control logic are configured to decode the encrypted key code.

18. The data transmission controller of claim 15, wherein the circuitry and control logic further are configured to:

*in response to a determination that the IP address code element, a discrete security code element corresponding to a predetermined security level, and the transmission originator are authenticated, establish a controlled data port to transmit the data of the transmission pack to a holding structure of the external recipient.*

19. The data transmission controller of claim 18, wherein the circuitry and control logic establish the controlled data port to transmit the data of the transmission pack to a mailbox of the external recipient.

20. The data transmission controller of claim 18, wherein the circuitry and control logic establish the controlled data port to transmit the data of the transmission pack to a mini-server of the external recipient.

21. The data transmission controller of claim 18, wherein the discrete security code element is a secure key code.

22. The data transmission controller of claim 15, wherein the circuitry and control logic further are configured to:

*in response to a determination that the IP address code element, a discrete security code element corresponding to a predetermined security level, and the transmission originator are not authenticated, transmit the transmission pack back to the external transmission originator.*

23. The data transmission controller of claim 15, wherein the circuitry and control logic further are configured to:

*in response to a determination that the IP address code element, a discrete security code element corresponding to a predetermined security level, and the transmission originator are not authenticated, transmit the transmission pack to the external recipient for discrete review by the external recipient.*

24. The data transmission controller of claim 15, wherein the circuitry and control logic further are configured to:

*in response to a determination that the IP address code element, a discrete security code element corresponding to a first security level, and the transmission originator are authenticated, establish a secure data port to transmit the data of the transmission pack to the external recipient;*

*in response to a determination that the IP address code element, a discrete security code element corresponding to a second security level, and the transmission originator are authenticated, establish a controlled data port to transmit the data of the transmission pack to a holding structure of the external recipient; and*

*in response to a determination that the IP address code element, a discrete security code element corresponding a predetermined security level, and the transmission originator are not authenticated, transmit the transmission pack back to the external transmission originator.*

25. The data transmission controller of claim 13, wherein the data transmission controller is a router.

26. The data transmission controller of claim 13, wherein the data transmission controller is a hub router.

27. The data transmission controller of claim 13, wherein the data transmission controller is located at an internet service provider hub router.

28. The data transmission controller of claim 13, wherein the data transmission controller is located at an NAP distribution point.

29. The data transmission controller of claim 13, wherein the data transmission controller is part of a recipient personal computer.

30. The data transmission controller of claim 13. wherein the data transmission controller is part of an Intranet terminal receiver/router.

31. A data transmission controller, comprising:
*means for authenticating a transmission pack of data, including means for determining whether the transmission pack includes a discrete security code element corresponding to a discrete security code assigned to an external transmission originator, where the discrete security code is one of plural pre-assigned security codes, and where each security code and corresponding security code element represents one of plural predetermined security levels; and*
*means for establishing a discrete data port for transmitting data of the authenticated transmission pack, where a type of the discrete data port is selected from plural predetermined data port types corresponding to the plural predetermined security levels.*

32. The data transmission controller of claim 31, wherein the means for authenticating further comprises means for scanning and comparing elements of the transmission pack with an authentic transmission pack format.

33. The data transmission controller of claim 31, wherein the means for authenticating comprises means for determining whether the transmission pack includes a discrete recipient IP address code element corresponding to a discrete recipient IP address code of an external recipient.

34. A protection method for controlling data transmission, comprising:
*authenticating a received transmission pack of data, including determining whether the transmission pack includes a discrete security code element corresponding to a discrete security code assigned to an external transmission originator, where the discrete security code is one of plural pre-assigned security codes, and where each security code and corresponding security code element represents one of plural predetermined security levels; and*

*in accordance with a result of the authenticating, establishing a discrete data port for transmitting data of the authenticated transmission pack, where a type of the discrete data port is*

*selected from plural predetermined data port types corresponding to the plural predetermined security levels.*

35. The protection method of claim 34, wherein the authenticating further comprises:
*scanning and comparing elements of the transmission pack with an authentic transmission pack format.*

36. The protection method of claim 35, wherein the authenticating further comprises:
*determining whether the transmission pack includes a discrete recipient IP address code element corresponding to a discrete recipient IP address code of an external recipient.*

37. The protection method of claim 36, further comprising:
*in response to a determination the scanning and comparing authenticate the IP address code element, a discrete security code element corresponding to a predetermined security level, and the transmission originator, establishing a secure data port to transmit the data of the transmission pack to the external recipient.*

38. The protection method of claim 37, wherein the discrete security code element is an encrypted key code, and the authenticating further comprises decrypting the encrypted key code.

39. The protection method of claim 36, further comprising:
*in response to a determination the scanning and comparing authenticate the IP address code element, a discrete security code element corresponding to a predetermined security level, and the transmission originator, establishing a controlled data port to transmit the data of the transmission pack to a holding structure of the external recipient.*

40. The protection method of claim 39, further comprising transmitting the data of the transmission pack via the controlled data port to a mailbox of the external recipient.

41. The protection method of claim 39, further comprising transmitting the data of the transmission pack via the controlled data port to a mini-server of the external recipient.

42. The protection method of claim 39, wherein the discrete security code element is a secure key code.

43. The protection method of claim 36, further comprising:
*in response to a determination the scanning and comparing fail to authenticate an IP address code element, a discrete security code element corresponding to a predetermined security level, and the transmission originator, transmitting the transmission pack back to the external transmission originator.*

44. The protection method of claim 36, further comprising:
*in response to a determination the scanning and comparing fail to authenticate an IP*

*address code element, a discrete security code element corresponding to a predetermined security level and the transmission originator, transmitting the transmission pack to the external recipient for discrete review by the external recipient.*

45. The protection method of claim 36, further comprising:

*in response to a determination the scanning and comparing authenticate the IP address code element, a discrete security code element corresponding to a first security level, and the transmission originator, establishing a secure data port to transmit the data of the transmission pack to the external recipient;*

*in response to a determination the scanning and comparing authenticate the IP address code element, a discrete security code element corresponding to a second security level, and the transmission originator, establishing a controlled data port to transmit the data of the transmission pack to a holding structure of the external recipient; and*

*in response to a determination the scanning and comparing fail to authenticate an IP address code element, a discrete security code element corresponding to a predetermined security level, or the transmission originator, transmitting the transmission pack back to the external transmission originator.*

47. The data transmission recipient of claim 46, wherein the data transmission recipient is a personal computer.

48. The data transmission recipient of claim 46, wherein the data transmission recipient is a local area network.

49. The data transmission recipient of claim 46, wherein the data transmission recipient is an Intranet terminal receiver/router.

50. A data transmission system, comprising:

*at least one transmission originator, each transmission originator having at least one discrete security code assigned thereto;*

*at least one recipient, each recipient having at least one discrete recipient IP address code assigned thereto; and*

*a data transmission controller arranged in communication with the at least one transmission originator and the at least one recipient,*

*wherein the data transmission controller comprises circuitry and control logic configured to:*

*authenticate a transmission pack of data received from a discrete transmission originator, including*

*determine whether the transmission pack includes a discrete security code element corresponding to a discrete security code assigned to the discrete transmission originator, where the discrete security code is one of plural pre-assigned security codes, and where each security code and corresponding security code element represents one of plural predetermined security levels;*

*in accordance with a result of authentication, establish a discrete data port for transmitting data of the transmission pack, where a type of the discrete data port is selected from plural*

*predetermined data port types corresponding to the plural predetermined security levels: and*

*transmit data of the transmission pack via the discrete data port to a discrete recipient.*

51. The system of claim 50, wherein the at least one transmission originator is pre-assigned plural discrete security codes having different security levels.

52. The system of claim 50, wherein the data transmission controller comprises circuitry and control logic configured to:

*authenticate the transmission pack of data received from the discrete transmission originator, including*

*scan and compare elements of the transmission pack with an authentic transmission pack format.*

53. The system of claim 50, wherein the data transmission controller comprises circuitry and control logic configured to:

*authenticate a transmission pack of data received from a discrete transmission originator, including*

*determine whether the transmission pack includes a discrete recipient IP address code element corresponding to a discrete recipient IP address code of the discrete recipient, and*

*transmit the data of the authenticated transmission pack via the discrete data port to the discrete recipient.*